United States Patent
Liedtke et al.

(10) Patent No.: US 8,935,127 B2
(45) Date of Patent: Jan. 13, 2015

(54) METHOD FOR RECORDING PULSE SIGNALS

(75) Inventors: Mirko Liedtke, Jena (DE); Frank Klemm, Jena (DE); Manfred Loth, Kleinschwabhausen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 1050 days.

(21) Appl. No.: 12/970,019

(22) Filed: Dec. 16, 2010

(65) Prior Publication Data

US 2011/0119034 A1    May 19, 2011

Related U.S. Application Data

(63) Continuation of application No. PCT/EP2009/004266, filed on Jun. 12, 2009.

(30) Foreign Application Priority Data

Jun. 20, 2008    (DE) .......................... 10 2008 029 458

(51) Int. Cl.
*G06F 15/00*    (2006.01)
*G02B 21/00*    (2006.01)
(Continued)

(52) U.S. Cl.
CPC ........... *G02B 21/0076* (2013.01); *G01J 3/2889* (2013.01); *G01J 3/4406* (2013.01)
USPC ........... 702/189; 702/110; 702/127; 702/176; 702/180; 702/187; 702/79; 702/80; 356/316; 356/317; 356/318

(58) Field of Classification Search
CPC ................... G01D 9/005; G01J 3/4406; G01J 2003/2866; G01J 3/2889
USPC ........... 702/127, 126, 187, 189, 180, 110, 79, 702/80; 356/316, 317, 318
See application file for complete search history.

(56) References Cited

U.S. PATENT DOCUMENTS 5,249,231 A * 9/1993 Covey et al. .................. 711/163
5,319,369 A * 6/1994 Majos et al. .................. 341/101
(Continued)

FOREIGN PATENT DOCUMENTS

DE    19951188 A1    4/2001

OTHER PUBLICATIONS

User Handbook: DPC-230 16 Channel Photon Correlator, Becker & Hickl Gmbh, Berlin, Apr. 2008, pp. 1-12.
(Continued)

*Primary Examiner* — Carol S Tsai
(74) *Attorney, Agent, or Firm* — Westerman, Hattori, Daniels & Adrian, LLP

(57) ABSTRACT

A method for recording pulse signals which allows the reconstruction of a time reference. The time of every pulse signal event can be determined by counting sampling result bits preceding the respective sampling result bit using the known sampling frequency. For this purpose, every period of the sampling frequency is associated with a bit representing the respective sampling result and the sampling result bits are stored one by one and per channel in data blocks. The sampling frequency is preferably higher than a pixel clock, a sampling result bit associated with a flank of the pixel clock being marked. The pixel clock can thus be synchronized with the individual events exactly per sampling period. The invention further relates to the field of fluorescence correlation spectroscopy using confocal microscopes or laser scanning microscopes.

17 Claims, 4 Drawing Sheets

(51) Int. Cl.
*G01J 3/28* (2006.01)
*G01J 3/44* (2006.01)

(56) References Cited

U.S. PATENT DOCUMENTS

| | | | | |
|---|---|---|---|---|
| 5,754,449 | A | * | 5/1998 | Hoshal et al. ................. 702/187 |
| 5,787,132 | A | * | 7/1998 | Kishigami et al. ............ 375/354 |
| 6,356,612 | B1 | * | 3/2002 | Mitsutani ....................... 375/376 |
| 6,591,223 | B1 | * | 7/2003 | Geist et al. .................... 702/176 |
| 6,662,339 | B1 | * | 12/2003 | Laneman et al. .............. 714/799 |
| 6,791,596 | B2 | * | 9/2004 | Nihei et al. .................... 347/247 |
| 7,773,324 | B2 | * | 8/2010 | Ozdemir ......................... 360/51 |
| 7,787,442 | B2 | * | 8/2010 | Akahane et al. ............... 370/352 |
| 2001/0052827 | A1 | * | 12/2001 | Sugita et al. ................... 332/109 |
| 2002/0020819 | A1 | | 2/2002 | Wolleschensky et al. |
| 2004/0190553 | A1 | * | 9/2004 | Ward et al. ..................... 370/474 |

OTHER PUBLICATIONS

Wahl, M., et al., "Dead-time optimized time-correlated photon counting instrument with synchronized, independent timing channels," Review of Scientific Instruments 78, 033106, 2007.

Böhmer et al., "Time-resolved confocal scanning device for ultrasensitive fluorescence detection," Review of Scientific Instruments, 72, Nov. 2001, pp. 4145-4152.

* cited by examiner

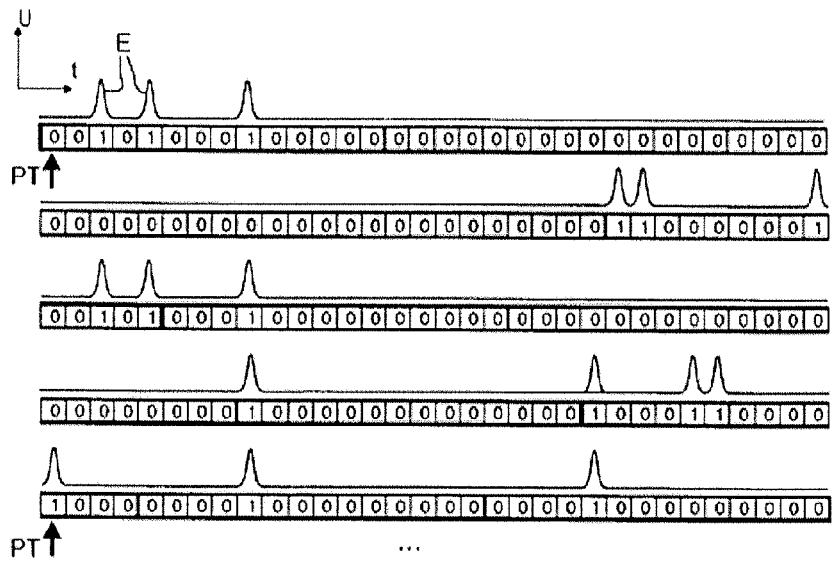

Fig. 4A

LVDS-Header[0]= BGRAB; LVDS_OFFSET
LVDS-Header[1]= CRC4; length (FCS-DATA)
FCS-DATA[0] = E810$_{16}$ - Start of the FCS-Block with SYNC-information bit 13 and LVDS address
FCS-DATA[1] = 4A20$_{16}$ - 2 + 14 bit FCS pattern
FCS-DATA[2] = 0029$_{16}$ -2 + 14 bit spacing counter
FCS-DATA[3] = 7025$_{16}$ - 2 + 14 bit FCS pattern
FCS-DATA[4] = 4200$_{16}$ - 2 + 14 bit FCS pattern
FCS-DATA[5] = 0015$_{16}$ -2 + 14 bit spacing counter
FCS-DATA[6] = 6000$_{16}$ - 2 + 14 bit FCS pattern
FCS-DATA[7] = 800A$_{16}$ - Information for a not completely used subsequent
        FCS pattern (10 bit are valid)
FCS-DATA[8] = 6308$_{16}$ - 2 + 14 bit FCS pattern; before PT: FCS_DATA[13:4]
       after PT: FCS_DATA[3:0]
FCS-DATA[9] = E810$_{16}$ - Start of the FCS block with SYNC information bit 13
      und LVDS address
FCS-DATA[10] = 4200$_{16}$ -2 + 14 bit FCS pattern

Fig. 4B

METHOD FOR RECORDING PULSE SIGNALS

BACKGROUND OF THE INVENTION (1) Field of the Invention

The invention relates to a method for recording pulse signals of an input channel of a microscope, in particular of a confocal microscope or a laser scanning microscope, where the channel is sampled at a predetermined sampling frequency for pulse signals.

(2) Description of Related Art Including Information Disclosed Under 37 CFR 1.97 and 1.98

The invention is preferably used for fluorescence correlation spectroscopy (FCS), and scanning fluorescence correlation spectroscopy (S-FCS), carried out by means of a laser scanning microscope (LSM). With FCS and S-FCS, individual fluorescence emissions are recorded with photon counting detectors, the response signal of which is digitized with a predetermined sampling frequency. The response signals are short pulse signals. The occurrence of a pulse signal is referred to as a pulse signal event. The temporal density of the events is low in this case. A Photomultiplier Tube (PMT) or Avalanche Photodiode (APD), can be used as a photon counting detector.

In the prior art, a method for recording pulse signals of two input channels for FCS are known from U.S. Pat. No. 6,591,223, for example, the disclosure of which is incorporated by reference herein as if reproduced in full. In a first embodiment, after the detection of an event in at least one of the input channels or after overflow of a counter, the current state of all input channels together with a magnitude that characterizes the time interval to the last storage are stored. In a second embodiment, after the detection of an event in at least one of the input channels or after overflow of a counter, the states of all input channels in the scanning cycle in which the event has occurred, and for a specified number of scanning cycles after the occurrence of the first event together with a magnitude that characterizes the time interval to the last preceding storage, are stored.

Due to the storing scheme of the states of all input channels, this type of recording has disadvantages in that the absolute times at which the individual events have occurred cannot be reconstructed and that the number of input channels which can be used simultaneously is basically limited by the width of the memory registers in which the digitized input channels are mapped.

BRIEF SUMMARY OF THE INVENTION

The purpose of the present invention is to provide a method of the type mentioned at the outset so that the time reference of the individual events can be accurately reconstructed. In this context it should in principle also be possible to use an unlimited number of input channels.

The invention teaches that every period of the sampling frequency is associated with a bit representing the corresponding sampling result and that these sampling result bits are stored successively in a data block that is associated with the corresponding input channel. During the scan, a one-bit digitization of the pulse signals occurs, for example, so that a corresponding bit results as the sampling result for every scanning period that indicates whether a pulse event has occurred in the corresponding sampling period. Other forms of sampling are possible, such as that the digitization can be carried out with a resolution of more than one bit, where these sampling result bits are determined by comparisons with a specified threshold value.

The invention teaches that the continuous association and block-by-block storage of the sampling result bits, the time of every pulse signal event can be determined relative to the beginning of the data block by means of the known sampling frequency simply by counting the sampling result bits preceding the corresponding sampling result bit whose number corresponds to the number of sampling periods that have passed until then. This also applies during several consecutive data blocks. If the first data block is started with the beginning of the sampling, the absolute time reference can also be reconstructed in this manner within the scope of the measurement. Due to the block-by-block association to the input channel and storage without intercalation, any number of input channels can be simultaneously recorded, in principle.

For this purpose, it is possible to store the sampling result bits in the data block sequentially, directly or indirectly. To minimize the storage space required, the sampling result bits can be suitably stored directly bit-by-bit. Alternatively, it is also conceivable to insert padding bits between the sampling result bits in order to align the data stream flush with byte or word boundaries or to simplify the calculation of checksums. It is also possible, for example, to insert intermediate bits for certain communication protocols, which avoid the formation of bit patterns that are unfavorable for the transmission. Padding bits or other intermediate bits should be stored suitably only in defined positions in the bit stream so that they can be distinguished easily from the useful data. In this manner, especially unique identification bit patterns data inserted between the sampling event bits can be implemented.

In a first preferred embodiment of the invention, the sampling occurs simultaneously with a pixel clock that operates at a frequency that is lower than the sampling frequency, where, if an edge (i.e. the waveform edge formed when a signal rises or falls) of the pixel clock is identified at an edge point of time that is marked on the sampling result bit associated to the edge point of time, this linkage facilitates the synchronization between a pixel clock and the individual events of the input channels exactly per sampling period. As a result, correlations can be calculated and represented accurately on a per-pixel basis. The marking of the sampling result bit associated with the edge point of time point of time can be done in different ways, such as by a leading or trailing unique synchronization identification bit pattern, which cannot occur otherwise.

Preferably, the sampling result bits are stored together as words (hereafter designated as event words), where a specified quantity of bits of such event word is kept clear and provided with a first identification bit pattern. The word-wise storage facilitates easy handling and transmission of the data block with a digital computer.

Particularly preferred are method embodiments in which in place of the sequence of bits, which represent only eventless periods, the length of the sequence is stored. The length can be the number of the replaced bits, for instance. If the eventless periods are replaced by a length entry, the volume of data is reduced significantly, since in FCS measurements, only a few pulse events, i.e. long periods without events occur. The incidence of data in a length entry that is 14 bits wide can be reduced by a factor from up to $2^{14}=16384$ in eventless periods, for example.

In addition, the length of the eventless sequence is preferably stored as a word (subsequently designated as an idle word), where a specified quantity of bits of this idle word is kept clear and is provided with a second identification bit pattern. As a result, the length of the replaced bit sequence can be stored without further effort in the "replaced event words" unit, for example. But it is also possible to specify the length entry in a unit that is independent of the length of the event word, such that a length entry of "one" corresponds to a sequence of 8, 16, 20, 32, or 64 eventless sampling result bits, for example. In all cases, long eventless time periods can be recorded more efficiently. With a length unit of 14 bits, for example, i.e. the content of a replaced event word, less substitute words are required for the same eventless period by a factor of 14. With a length unit of 32 bits, less substitute words are required by a factor of 32, for example.

In another preferred embodiment of the invention, in order to mark a sampling result bit that is associated with an edge point of time before or after the event word, which contains the sampling result bit associated with the edge point of time, the bit position of the associated sampling result bit is stored within this event word. This linkage facilitates the synchronization between a pixel clock and the individual events of the input channels exactly per sampling period. As a result, correlations can be calculated and represented accurately on a per-pixel basis.

For this purpose, the bit position is preferably stored as a word (hereafter designated as a synchronization word), where a specified quantity of bits of this synchronization word is kept clear and provided with a third identification bit pattern. This facilitates a high efficiency of storage with pixel clock synchronization. The scanning is advantageously started at edge point of time of the pixel clock. As a result thereof it is not necessary to have a synchronization word at the beginning of the data block.

Preferably, at the start of the data block, a length of the data block, an input channel identification and, a checksum are stored via the data block. As a result, the transmission of the data block to a control computer is easily made possible. An input channel identification permits sampling of at least two input channels simultaneously and storing of a separate data block for each of the input channels and transferring them in the same manner to the control computer. A checksum assists in minimizing transmission errors. It is useful, if each word has a length of 8, 16, 32, or 64-bit.

The invention comprises also a computer program as well as a matching control unit for performing a method described above. It furthermore comprises a fluorescence detector module for a confocal microscope, in particular a scanning microscope with such a control unit and at least two detection channels as input channels. A confocal microscope, in particular a scanning microscope, can alternatively also be provided with an integrated control unit and at least two detection channels as input channels.

BRIEF DESCRIPTION OF THE SEVERAL VIEWS OF THE DRAWINGS

In the following, the invention is explained in greater detail by means of exemplary embodiments in the drawings as follows:

FIGS. 4A and 4B show a sequence of the states of the input channels as well as the corresponding part of the resulting data block.

DETAILED DESCRIPTION OF THE INVENTION

Figure 1A:
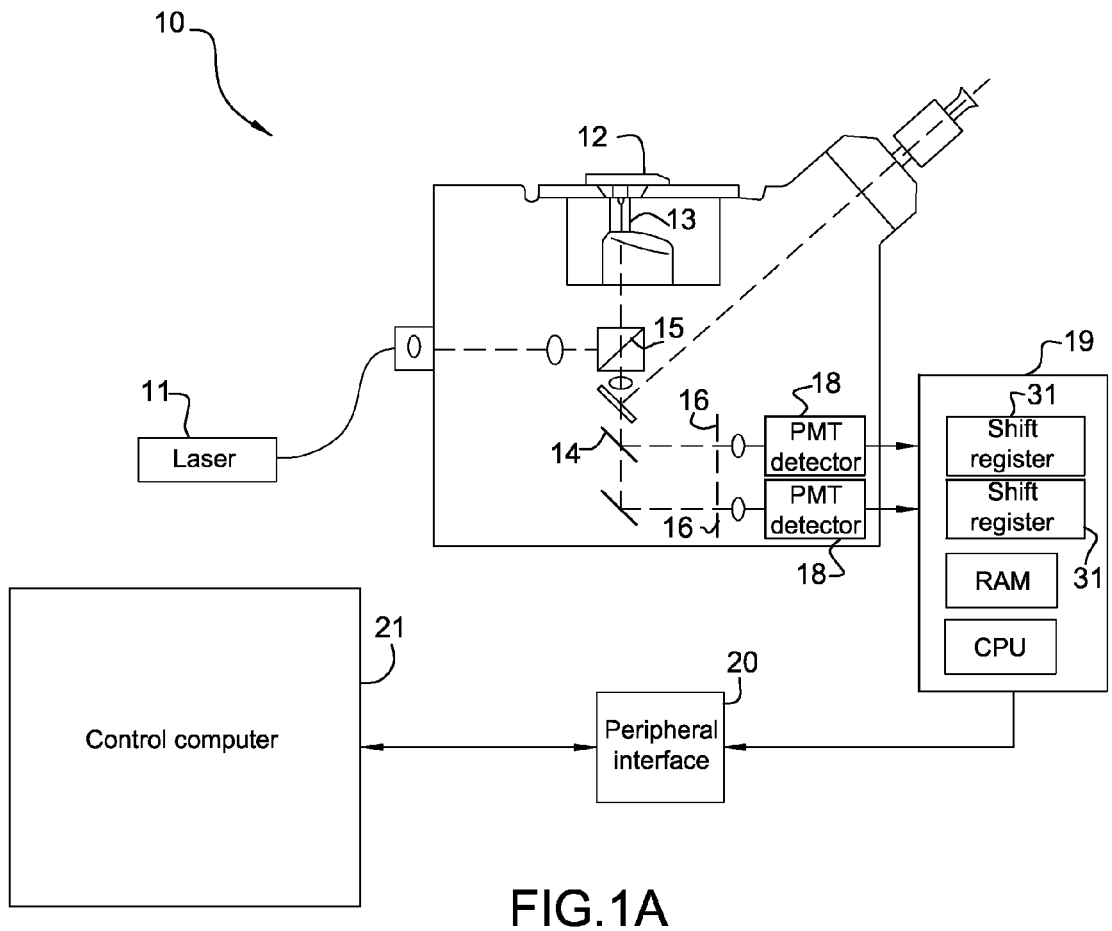
FIG. 1A is a schematic diagram of a first microscope for application of the recording method.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. The same references are used for all corresponding components in the drawings.

FIG. 1A illustrates an example of a simple confocal microscope 10 in which the laser beam emitted by one or several lasers 11 is focused by a microscope objective lens 13 of high numerical aperture into a test specimen 12. The volume of excitation in the test specimen 12 is only a few femtoliters in this context. The fluorescent radiation created in the test specimen 12 is collected again by the objective lens 13 by means of a main color splitter 15 separately from the excitation light and is subsequently supplied by two separate detection channels by means of an auxiliary color splitter 14. In each of the two detection channels, a confocal pinhole aperture 16 is provided, both of which are arranged in a conjugated plane in relation to the focal plane of the objective lens 13. After transmission through the confocal pinhole apertures 16, the light signal contained in each of the detection channels is detected by high-sensitivity detectors 18 that are designed for the detection of individual photons. The confocal pinhole apertures 16 ensure at the same time that the volume in the test specimen 12 from which the fluorescent radiation is detected exhibits the small size of the volume of excitation. Because of the very small excitation and detection volume, pulse signals occur in both detection channels, where the pulse signal essentially consists of individual pulses with longer pulse intervals.

The electrical signals of the two detectors 18 are supplied into a control unit 19 as input channels. From the fluorescence events detected in this manner, correlations (such as autocorrelations or cross-correlations) are calculated in a control computer 21 within the scope of an FCS or S-FCS analysis. For this purpose, the control unit 19 is connected via an LVDE bus (low-voltage differential signaling) with a peripheral interface 20, which for its part is connected via an Ethernet bus with the control computer 21. The detected fluorescence events must therefore be transmitted via both buses. Therefore it is useful to minimize the volume of data transmitted per unit of time.

Figure 1B:
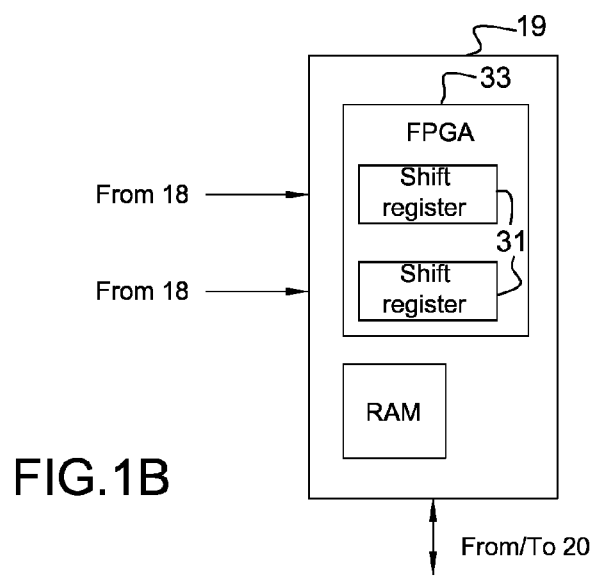
FIG. 1B is a schematic of an alternative control unit from that used in FIG. 1A.

In the control unit 19, the detectors signals are digitized with a resolution of one bit, where the input channels are sampled for pulse signals with a variable sampling frequency f of 66 MHz, for example. The value of each of these sampling result bits indicates whether in the associated sampling period of approximately 15 ns duration a pulse signal was recorded by the detector, or in other words, whether a pulse signal event has occurred during this period. A value of 1 (true) represents a pulse signal and a value of 0 (false) represents an eventless period, for example, or vice versa. For each input channel, a separate 14-stage shift register 31 is provided. In each cycle of the sampling frequency, the shift register is shifted to the left by one bit and the current sampling result bit is written into the lowest stage that has become clear. The shift registers are superimposed in the address area of the CPU of the control unit 19, for example, so that they can be read out with a single command. As shown in FIG. 1B, in alternative embodiments, a programmable, integrated circuit (FPGA=field programmable gate array) 33 can be used in place of a CPU, for example, in which the shift registers are integrated.

The CPU of the control unit 19 supplies a first pointer to a memory area of a random access memory (RAM) of the control unit 19 and a second pointer to a second memory area in the RAM. In the first memory area, the CPU successively establishes a first data block, which is associated with the first input channel. In the second memory area, it successively establishes a second data block, which is associated with the second input channel. The data blocks are expanded at a word width of 16-bits, word-by-word. In both data blocks, the microscope 10 is initially stored as the LVDS sender in the first word and both counters are incremented. The corresponding second word is initially kept clear by incrementing both counters. The first two words are designated as LVDS headers. After the LVDS header, the FCS data of the corresponding input channels are stored word-by-word in each data block. After each stored word, the corresponding counter is incremented so that it points to the next still-unused word.

The FCS data words can be made up as follows, for instance:

| (15:14) | (13:0) | Explanations |
|---|---|---|
| $11_2$ | 13-SYNC 11:0 LVDS address | Start of a data block with synchronization information and LVDS address of the input channel |
| $10_2$ | 13-SYNC 3:0-number of the valid FCS bits | Synchronization information with entry of the bit position of the edge of the frequency of the pixel clock in the following event word (MSB-flush) |
| $01_2$ | FCS specimens | Fourteen bits of sampling results |
| $00_2$ | Interval counter | Number of eventless sampling periods with a value between 15 and $2^{14}-1$ |

The FCS data words are partitioned into identification bits (15:14) and data bits (13:0). The two highest-order bits are used as identification bits and the 14 lowest-order bits are used as data bits, for example. It is therefore possible to differentiate $2^2=4$ different types of FCS data words. Same as in the exemplary embodiment viewed, with several input channels, the first FCS data word of a block with the bit identification pattern $11_2$, for example, in the fourteen data bits can contain a channel identification number of the corresponding input channel. The CPU controls a zero initialized scanning cycle counter, which is incremented in every scanning period.

Once the sampling cycle counter reaches the number of data bits (and therefore the width of the shift register, fourteen in this case), then the CPU stores the content of the shift registers, in so far that at least one bit indicates the occurrence of a pulse event therein (signified by the "true" value), in the corresponding data block, i.e. in the data bits of corresponding FCS data words with the exemplary bit identification pattern $01_2$ ("event words"). If it involves fourteen eventless sampling periods (i.e. here therefore all bits have the "wrong" value), then the corresponding (zero-initialized) interval counter associated with the corresponding input channel is increased by fourteen. In both cases, the sampling cycle counter is reset subsequently.

The two interval counters have an exemplary width of fourteen bits each. If one of the interval counters overflows, then an FCS data word with the exemplary bit identification pattern $00_2$ ("idle word") is stored in the corresponding data block at the current pointer position which contains the counter reading of the corresponding interval counter in the data bits. Even if the measurement is stopped (by a user, for example), then such FCS data word is written into the corresponding data block for each interval counter where the value exceeds zero. The bit identification pattern $10_2$, however, is not used in this exemplary embodiment. It can be used for synchronization with a simultaneous pixel clock.

The storage of $00_2$- and $01_2$ FCS data words is repeated until a data block has either reached a specified maximum length, or until the measurement is completed. Then, the corresponding data block and/or both data blocks is/are terminated. For this purpose, a checksum is stored in the upper four bits of the second word of the corresponding data block via the corresponding data block and in the lower eight bits the length of this data block is stored in words. The length can be determined from the corresponding counter reading that has been reached minus the starting address of the corresponding memory area, for example.

Every terminated data block is transmitted via the LVDS bus to the peripheral interface 20, which removes the first two words of the data block after verification of the checksum. Thereupon it transmits it via the Ethernet bus to the control computer 21, where it is decoded and further processed. Insofar as the measurement has not yet been completed, the recording is continued in the control unit 19 by resetting the corresponding memory area counter to the third word of the corresponding data block and the corresponding interval counter is initialized with zero. As an option, the transfer via the Ethernet can be dispensed with and the evaluation can be done locally.

In place of 16 bit words, the recording can also be performed with 8, 32, or 64-bit words. In place of two identification bits per word, also three or more identification bits can be used. The number of data bits per word reduces correspondingly. Independently of that the block-by-block coding of the sampling result bits can be performed in a corresponding manner with three, four, and more input channels. The data block is stored for each input channel and transmitted separately to the control computer 21. In addition to one or several block-by-block coded input channels, it is also possible to code one or several input channels with the recording method described in DE 199 51 188 A1.

Figure 2:
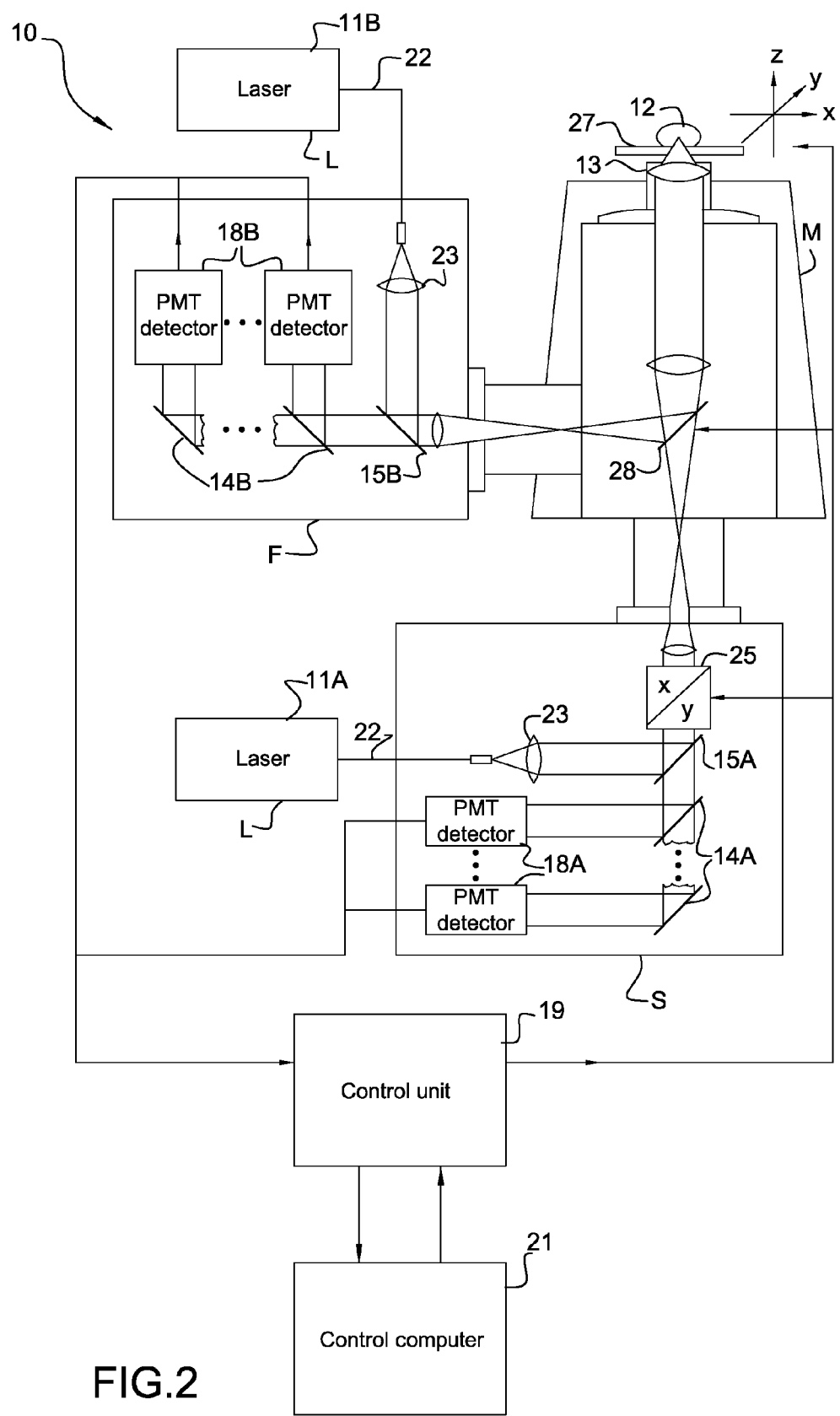
FIG. 2 is a schematic diagram of a second microscope for application of the recording method.

FIG. 2 illustrates a schematic section of the beam path of a more complex confocal microscope 10 with four, for example, or alternatively (not shown) up to 16 or more FCS input channels (only two of which are shown). This involves a laser scanning microscope 10. By means of microscope unit M (here, an inverse microscope for observation of a test specimen 12 on the table 27 that is adjustable in the X, Y, and Z direction by an objective lens 13 below that test specimen 12 and a tube lens TL using a scan module S, light from the laser light source 11A with one or several wavelengths is focused into the test specimen 12 directly or by an optical fiber 22 via collimating optics 23 as well as a main color splitter 15A. The scanner mirrors 25 allow the light beam to be deflected in the X and Y direction. Different layers of test specimens can be scanned by the vertical adjustment of the specimen carrier 27 or the objective lens 13.

The light which comes from the test specimen passes again through the scanner mirror 25 and is assigned to the PMT detectors 18A by means of the auxiliary color splitters 14A and converted into electrical signals via a control unit 19 for analysis in a control computer 21. The control unit 19 and the control computer 21 are connected via an LVDS bus. In alternative embodiments (not shown) an additional bus as well as an Ethernet can also be interposed here. The signals measured by means of the detectors 18A are utilized for acquisition of image information. In order to associate the measured signals to pixels, a pixel clock is created. The pixel clock can involve a square-wave signal with a frequency of 2.5 MHz, for example.

Using a beam switchover unit 28, such as a pivoted swiveling full mirror or semitransparent mirror, light from a further laser light source 11B with one or several wavelengths is focused using a fluorescence detector module F into the test specimen 12 via a main color splitter 15B. The light sources 11A and 11B can also be identical and be inserted into the modules S and/or F via suitable deflection and switching elements (not shown). In this manner, S-FCS can be implemented.

The fluorescent light coming from test specimen 12 is supplied to the FCS detectors 18B by the auxiliary color splitter 14B for conversion into electrical signals for analysis, and the resulting pulse signals are digitized through sampling and assigned to the sampling periods. Each detector 18B represents a separate input channel in this context. The sampling is performed at a variable frequency f of 80 MHz, for example, simultaneous to the uniform 2.5 MHz pixel clock for all input channels. The sampling result bits determined in this manner are recorded in separate data blocks (one per input channel) as described in FIG. 1 and transferred block-by-block to the control computer 21. For this purpose, every input channel is identified with its own channel identification number in the corresponding first FCS data word of the corresponding data block. Alternatively, this identification could be stored in unused bits in one of the two words of the LVDS header in an additional word in the LVDS header or after the FCS data words.

The control unit 19 comprises, for the synchronization with the pixel clock, an electronic trigger circuit for monitoring the pixel clock, for example, which triggers an interrupt request (IRQ) in the CPU (such as a FPGA) in the control unit during the identification of a rising edge. In response thereto, the CPU backs up the current status of the pixel clock counter in a separate memory area which is initialized with an invalid (false) value and is again described as an invalid value each time the pixel clock counter is reset. The separate memory area is always read out at a time when the pixel clock counter reaches its maximum value (i.e. the width of the shift register, here fourteen). If the readout of the separate memory area yields an invalid value, then the CPU initially verifies whether one of the interval counters is larger than zero. For each input channel for whose interval counter this is applicable, the control unit 19 stores the current interval counter in the corresponding data block the same as if a pulse signal event was registered in the corresponding shift register. Thereafter, the control unit 19 stores correspondingly one FCS data word with the exemplary identification bit pattern in every data block 012 (synchronization word), which contains the value read-out from the separate memory area in the data bits. This value indicates the number of the bit in whose sampling period the positive edge of the pixel clock was. The numbering can, for example, start either at the least significant bit (LSB) or at the most significant bit (MSB). The bit entry of the dot clock edge refers to the event or idle word to be stored immediately thereafter. For this purpose, the recording method is continued as described in FIG. 1.

The transmitted pulse signals are used for the FCS analysis in control computer 21. Depending on the number of the installed detection channels, this can involve autocorrelation or cross correlation analyses. In this process, at the current sampling location, diffusion times, particle numbers, service life and/or proportions of components are determined. By the integration of the fluorescence detection module F into the confocal laser scanning microscope 10, by the linkage of the sampling event bits and pixel clock edge points of time precisely in accordance with the sampling periods, it is possible to combine FCS analysis results of measurements at different sampling locations with high accuracy into a pictorial result.

As a result, FCS measuring locations can be determined with high accuracy and without damage to test specimens, and on the other hand, FCS analytical results of measurements at various locations can be used for imaging. It is thus possible, for example, to create a colored two dimensional or three-dimensional presentation of diffusion times or other analytical results, depending on the measuring location. Furthermore, using memory-compatible assignment, the FCS image taken can, for example, be pictorially linked as an additional color with different color LSM images per channel. Is also possible to create and represent FCS/LSM subtraction images or quotient images or other combinations.

Figure 3:
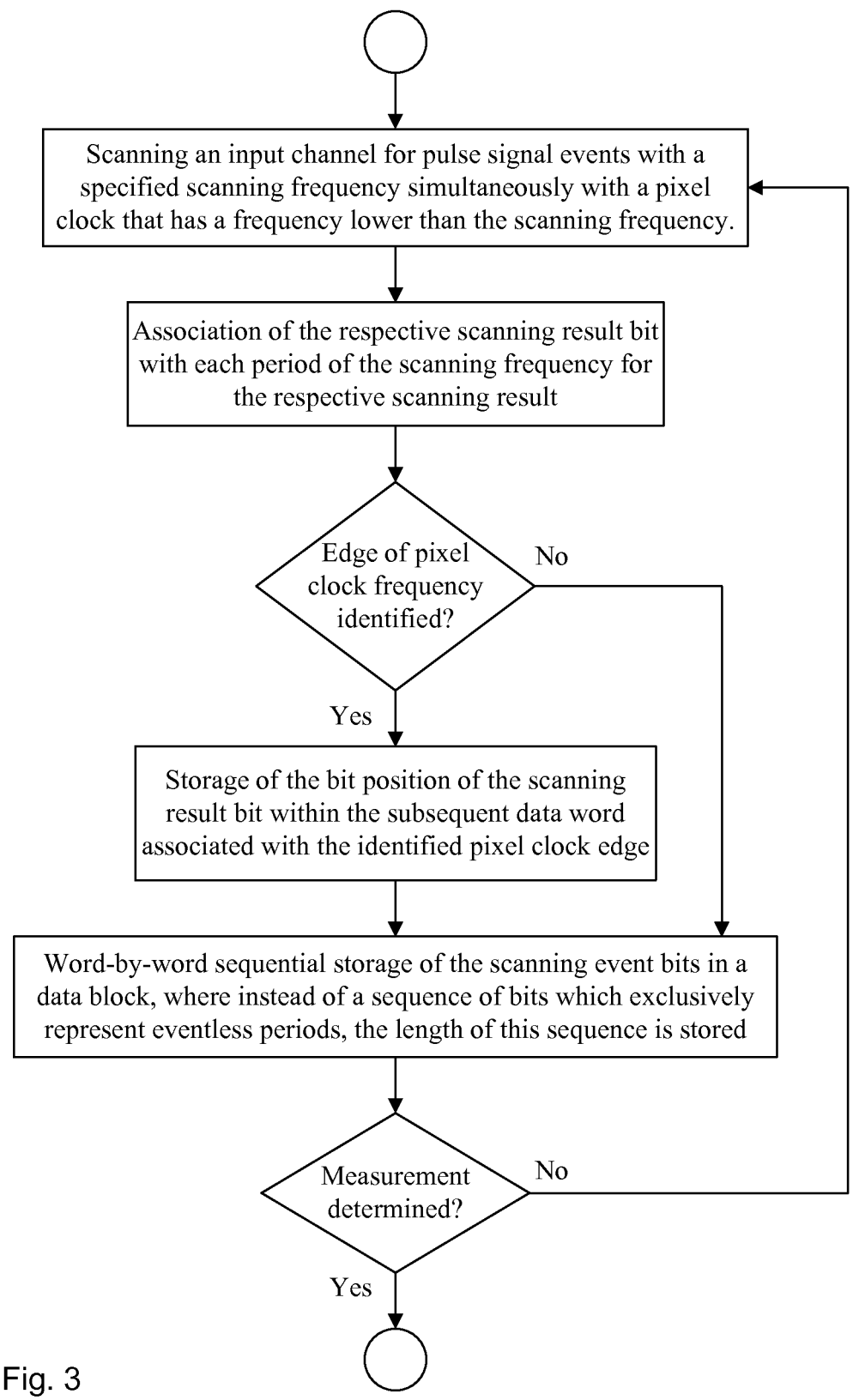
FIG. 3 is a flow chart of the recording method.

The decisive steps performed by the control unit 19 during the recording are recapitulated in FIG. 3.

Section FIG. 4A shows an example for a sequence of sequence result bits of a single input channel "0" and Section FIG. 4B the resulting data block, where the recording microscope has the LVDS bus identification $810_{16}$. A symbolic signal pulse E has been plotted in each sampling result bit that was set. The times at which a rising edge PT of the pixel clock is identified are marked with arrows.

Using the shift register width and number of data bits of fourteen in the example, a minimum of (without interval counter) $255 \times 14 = 3570$ sampling result bits can be encoded and transmitted in a data block. The result thereof, at a scanning frequency of 80 MHz, is a total time of 44,625 µs per data block. For the transfer of the data via the LED bus, a data volume of $(255+2) \times 2$ bytes results. For the transfer of this data volume in real time, i.e. in 44,625 µs, this requires a bandwidth of 11.6 MB/s. With a LVDS bus clock of 60 MHz, the maximum bandwidth is 120 MB/s, so that a maximum of 10 FCS input channels encoded as taught by the invention can be transmitted simultaneously. More input channels (for example 16) can be used, for example, by decreasing the sampling frequency.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically disclosed.

LIST OF REFERENCE SYMBOLS

10 Confocal microscope
11 (A, B) Laser
12 Test specimen
13 Microscope objective lens
14 (A, B) Auxiliary color splitter
15 (A, B) Main color splitter
16 Confocal diaphragm
18 (A, B) PMT detector
19 Control unit
20 Peripheral interface
21 Control computer
22 Optical waveguide
23 Collimating optics
24 Beam recombiner
25 Scanner mirror
26 Scan lens
27 Specimen carrier
28 Radiation switchover unit
E Signal pulse PT Pixel clock edge point of time
M Microscope unit
S Scan module
F Fluorescence detector module

What is claimed is:

1. A method for recording pulse signals of an input channel of a microscope, the method comprising the steps of:
   sampling the input channel for pulse signals at a predetermined sampling frequency to produce a sampling result;
   associating every period of the predetermined sampling frequency with a bit representing the corresponding sampling result;
   simultaneously with the sampling step, operating a pixel clock that has a frequency that is lower than the predetermined sampling frequency;
   if a an edge of the pixel clock is identified at an edge point of time, marking the sampling result bit associated with the edge point of time; and
   storing the sampling result bits in sequence in a data block.

2. The method according to claim 1, wherein in the storing step, the sampling result bits are stored in the data block sequentially, directly.

3. The method according to claim 1, wherein in the storing step, the sampling result bits are stored in the data block sequentially, indirectly.

4. The method according to claim 1, wherein in the storing step, the sampling result bits are stored together as words, and
   a predetermined quantity of bits of such words are kept open and provided with a first identification bit pattern.

5. The method according to claim 1, wherein in order to mark a sampling result bit that corresponds to an edge point of time before or after the word which contains the scanning result bit associated with the edge point of time, the bit position of the associated sampling result bit is stored within the word.

6. The method according to claim 5, wherein the bit position is stored as a word, a predetermined quantity of bits of the words are kept open and provided with a third identification bit pattern.

7. The method according to claim 1, wherein in the sampling step, the sampling is started at an edge point of time.

8. The method according to claim 1, further comprising the step of:
   at the start of the data block, storing a length of the data block.

9. The method according to claim 8, further comprising the step of storing an input channel identification and a checksum at the beginning of the data block.

10. The method according to claim 1, characterized in that each word has a length of 8, 16, 32, or 64-bit.

11. The method according to claim 1, wherein in the sampling step, at least two input channels are sampled simultaneously and wherein in the storing step, a separate data block is stored for each of the input channels.

12. A method for recording pulse signals of an input channel of a microscope, the method comprising the steps of:
   sampling the input channel for pulse signals at a predetermined sampling frequency and simultaneously sampling the input channel for pulse signals at a pixel clock that has a frequency that is lower than the predetermined sampling frequency, to produce a sampling result;
   associating every period of the predetermined sampling frequency with a bit representing the corresponding sampling result, wherein the bits in sequence represent only eventless periods;
   if a an edge of the pixel clock is identified at an edge point of time, marking the sampling result bit associated with the edge point of time; and
   storing the length of the sequence of bits.

13. The method according to claim 12, wherein the length of the eventless sequence is stored as a word, where a predetermined quantity of bits of the word are kept open and provided with a second identification bit pattern.

14. A fluorescence detection module for a microscope comprising:
   at least two detection channels as input channels; and
   a control unit having:
      means for sampling each of the input channels for pulse signals at a predetermined sampling frequency of a given period to produce a sampling result;
      means for associating every period of the predetermined sampling frequency with a bit representing the corresponding sampling result;
      means for operating a pixel clock that has a frequency that is lower than the predetermined sampling frequency, simultaneously with the sampling of each of the input channels;
      means for marking the sampling result bit associated with the edge point of time, if a an edge of the pixel clock is identified at an edge point of time; and
      means for storing the sampling result bits for each input channel in sequence in a data block.

15. A sampling microscope comprising:
   at least two detection channels as input channels; and
   a control unit having:
      means for sampling each of the input channels for pulse signals at a predetermined sampling frequency of a given period to produce a sampling result;
      means for associating every period of the predetermined sampling frequency with a bit representing the corresponding sampling result;
      means for operating a pixel clock that is at a frequency lower than the predetermined sampling frequency, simultaneously with the sampling of each of the input channels;
      means for marking the sampling result bit associated with the edge point of time, if a an edge of the pixel clock is identified at an edge point of time; and
      means for storing the sampling result bits for each input channel in sequence in a data block.

16. The scanning microscope of claim 15 wherein the scanning microscope is a confocal microscope.

17. The scanning microscope of claim 15 wherein the scanning microscope is a laser scanning microscope.

* * * * *